(12) United States Patent
Lorenz

(10) Patent No.: US 7,418,400 B1
(45) Date of Patent: Aug. 26, 2008

(54) INTERNET-ENABLED SYSTEM AND METHOD FOR ASSESSING DAMAGES

(75) Inventor: Scott Lorenz, Austin, TX (US)

(73) Assignee: Computer Sciences Corporation, Austin, TX (US)

( * ) Notice: Subject to any disclaimer, the term of this patent is extended or adjusted under 35 U.S.C. 154(b) by 891 days.

(21) Appl. No.: 09/603,303

(22) Filed: Jun. 23, 2000

(51) Int. Cl.
G06Q 40/00 (2006.01)
(52) U.S. Cl. ....................................................... 705/4
(58) Field of Classification Search ............... 705/4, 705/2–3; 707/104.1; 345/733, 742, 779
See application file for complete search history.

(56) References Cited

U.S. PATENT DOCUMENTS

| | | | |
|---|---|---|---|
| 4,553,206 A | 11/1985 | Smutek et al. | |
| 4,648,062 A | 3/1987 | Johnson et al. | |
| 4,812,966 A | 3/1989 | Takagi et al. | |
| 4,831,526 A * | 5/1989 | Luchs et al. | 705/4 |
| 4,837,693 A | 6/1989 | Schotz | |
| 4,839,822 A | 6/1989 | Dormond et al. | |
| 4,878,167 A | 10/1989 | Kapulka et al. | |
| 4,964,077 A | 10/1990 | Eisen et al. | |
| 4,975,840 A | 12/1990 | DeTore et al. | 705/4 |
| 4,987,538 A | 1/1991 | Johnson et al. | |
| 4,992,972 A | 2/1991 | Brooks et al. | |
| 5,093,911 A | 3/1992 | Parks et al. | |

(Continued)

FOREIGN PATENT DOCUMENTS

EP 0 280 773 9/1988

(Continued)

OTHER PUBLICATIONS

Utzschneider, "Microsoft Transaction Server and Internet Information Server: Technology for the Web," Feb. 6, 1998, pp. 1-6.

(Continued)

Primary Examiner—C Luke Gilligan
Assistant Examiner—R. David Rines
(74) Attorney, Agent, or Firm—Meyertons, Hood, Kivlin, Kowert & Goetzel, P.C.; Eric B. Meyertons

(57) ABSTRACT

An Internet-enabled method and system for processing insurance claims. The system may include an insurance claim processing server which is configured to estimate a value of an insurance claim as a function of insurance claim assessment data entered by a user during an insurance claim consultation session. The insurance claim assessment data may include one or more bodily injuries and one or more treatments of the bodily injuries. The insurance claim processing server may include a rules engine and a web server which may be executable to generate and send to a client computer system a plurality of web pages comprising insurance claim assessment questions. The client computer system may be coupled to the insurance claim processing server through a network such as the Internet. The client, including a web browser, may be operable to receive the insurance claim assessment data entered by the user and send the insurance claim assessment data across the network to the insurance claim processing server. The system may include additional client computer systems which are also coupled to the insurance claim processing server through the network.

14 Claims, 9 Drawing Sheets

U.S. PATENT DOCUMENTS

| | | | |
|---|---|---|---|
| 5,099,422 A | 3/1992 | Foresman et al. | |
| 5,155,806 A | 10/1992 | Hoeber et al. | |
| 5,157,768 A | 10/1992 | Hoeber et al. | |
| 5,191,522 A | 3/1993 | Bosco et al. | |
| 5,201,044 A | 4/1993 | Frey, Jr. et al. | |
| 5,233,513 A | 8/1993 | Doyle | |
| 5,241,671 A | 8/1993 | Reed et al. | 707/104.1 |
| 5,287,448 A | 2/1994 | Nicol et al. | |
| 5,307,262 A | 4/1994 | Ertel | |
| 5,307,265 A | 4/1994 | Winans | |
| 5,359,509 A | 10/1994 | Little et al. | |
| 5,386,566 A | 1/1995 | Hamanaka et al. | |
| 5,388,251 A | 2/1995 | Makino et al. | |
| 5,394,555 A | 2/1995 | Hunter et al. | |
| 5,432,904 A * | 7/1995 | Wong | 705/4 |
| 5,434,994 A | 7/1995 | Shaheen et al. | |
| 5,446,653 A | 8/1995 | Miller et al. | 705/4 |
| 5,455,947 A | 10/1995 | Suzuki et al. | |
| 5,471,575 A | 11/1995 | Giansante | |
| 5,481,667 A | 1/1996 | Bieniek et al. | |
| 5,483,632 A | 1/1996 | Kuwamoto et al. | |
| 5,499,330 A | 3/1996 | Lucas et al. | |
| 5,504,674 A | 4/1996 | Chen et al. | 705/4 |
| 5,504,675 A | 4/1996 | Cragun et al. | |
| 5,517,405 A | 5/1996 | McAndrew et al. | 706/45 |
| 5,523,942 A | 6/1996 | Tyler et al. | |
| 5,535,323 A | 7/1996 | Miller et al. | |
| 5,537,315 A | 7/1996 | Mitcham | 705/4 |
| 5,550,734 A | 8/1996 | Tarter et al. | 705/2 |
| 5,550,976 A | 8/1996 | Henderson et al. | |
| 5,557,515 A | 9/1996 | Abbruzzese et al. | 705/9 |
| 5,586,310 A | 12/1996 | Sharman | |
| 5,613,072 A | 3/1997 | Hammond et al. | 705/4 |
| 5,638,508 A | 6/1997 | Kanai et al. | |
| 5,644,778 A | 7/1997 | Burks et al. | |
| 5,652,842 A | 7/1997 | Siegrist, Jr. et al. | |
| 5,655,085 A | 8/1997 | Ryan et al. | |
| 5,673,402 A | 9/1997 | Ryan et al. | 705/38 |
| 5,689,706 A | 11/1997 | Rao et al. | |
| 5,704,044 A | 12/1997 | Tarter et al. | 705/4 |
| 5,717,913 A | 2/1998 | Driscoll | |
| 5,732,221 A | 3/1998 | Feldon et al. | 705/3 |
| 5,732,397 A | 3/1998 | DeTore et al. | 705/1 |
| 5,745,901 A | 4/1998 | Entner et al. | |
| 5,748,953 A | 5/1998 | Mizutani et al. | |
| 5,768,505 A | 6/1998 | Gilchrist et al. | |
| 5,768,506 A | 6/1998 | Randell | |
| 5,768,578 A | 6/1998 | Kirk et al. | |
| 5,797,134 A | 8/1998 | McMillan et al. | |
| 5,809,478 A | 9/1998 | Greco et al. | |
| 5,832,481 A | 11/1998 | Sheffield | |
| 5,832,530 A | 11/1998 | Paknad et al. | |
| 5,835,897 A | 11/1998 | Dang | |
| 5,835,914 A | 11/1998 | Brim | |
| 5,850,442 A | 12/1998 | Muftic | |
| 5,862,325 A | 1/1999 | Reed et al. | |
| 5,870,711 A | 2/1999 | Huffman | |
| 5,873,066 A | 2/1999 | Underwood et al. | |
| 5,884,274 A | 3/1999 | Walker et al. | |
| 5,895,461 A | 4/1999 | De La Huerga et al. | |
| 5,899,998 A | 5/1999 | McGauley et al. | |
| 5,903,873 A | 5/1999 | Peterson et al. | 705/4 |
| 5,907,848 A | 5/1999 | Zaiken et al. | |
| 5,909,683 A | 6/1999 | Miginiac et al. | |
| 5,913,198 A | 6/1999 | Banks | 705/4 |
| 5,914,714 A | 6/1999 | Brown | |
| 5,915,241 A | 6/1999 | Giannini | 705/2 |
| 5,918,208 A | 6/1999 | Javitt | |
| 5,930,759 A | 7/1999 | Moore et al. | 705/2 |
| 5,933,816 A | 8/1999 | Zeanah et al. | |
| 5,937,189 A | 8/1999 | Branson et al. | |
| 5,950,169 A * | 9/1999 | Borghesi et al. | 705/4 |
| 5,950,196 A | 9/1999 | Pyreddy et al. | |
| 5,956,691 A | 9/1999 | Powers | 705/4 |
| 5,963,952 A | 10/1999 | Smith | |
| 5,970,464 A | 10/1999 | Apte et al. | 705/4 |
| 5,987,430 A | 11/1999 | Van Horne et al. | |
| 5,987,434 A | 11/1999 | Libman | |
| 5,991,733 A | 11/1999 | Aleia et al. | |
| 5,991,756 A | 11/1999 | Wu | |
| 5,995,947 A | 11/1999 | Fraser et al. | 705/38 |
| 5,999,940 A | 12/1999 | Ranger | |
| 6,012,053 A | 1/2000 | Pant et al. | |
| 6,016,504 A | 1/2000 | Arnold et al. | 709/200 |
| 6,029,150 A | 2/2000 | Kravitz | 705/39 |
| 6,029,195 A | 2/2000 | Herz | |
| 6,038,393 A | 3/2000 | Iyengar et al. | |
| 6,038,668 A | 3/2000 | Chipman et al. | |
| 6,049,665 A | 4/2000 | Branson et al. | |
| 6,061,657 A | 5/2000 | Whiting-O'Keefe | |
| 6,064,983 A | 5/2000 | Koehler | |
| 6,065,000 A | 5/2000 | Jensen | 707/3 |
| 6,065,047 A | 5/2000 | Carpenter et al. | |
| 6,073,104 A | 6/2000 | Field | |
| 6,081,832 A | 6/2000 | Gilchrist et al. | |
| 6,088,710 A | 7/2000 | Dreyer et al. | |
| 6,092,049 A | 7/2000 | Chislenko et al. | |
| 6,098,070 A | 8/2000 | Maxwell | 707/102 |
| 6,105,007 A | 8/2000 | Norris | |
| 6,112,986 A | 9/2000 | Berger et al. | |
| 6,115,690 A | 9/2000 | Wong | |
| 6,119,093 A * | 9/2000 | Walker et al. | 705/4 |
| 6,128,598 A | 10/2000 | Walker et al. | 705/4 |
| 6,134,582 A | 10/2000 | Kennedy | |
| 6,148,297 A | 11/2000 | Swor et al. | |
| 6,163,770 A | 12/2000 | Gamble et al. | |
| 6,185,540 B1 | 2/2001 | Schreitmueller et al. | |
| 6,199,115 B1 * | 3/2001 | DiRienzo | 709/236 |
| 6,202,054 B1 | 3/2001 | Lawlor et al. | 705/42 |
| 6,208,973 B1 * | 3/2001 | Boyer et al. | 705/2 |
| 6,226,623 B1 | 5/2001 | Schein et al. | |
| 6,236,972 B1 | 5/2001 | Shkedy | 705/1 |
| 6,236,975 B1 | 5/2001 | Boe et al. | |
| 6,237,035 B1 | 5/2001 | Himmel et al. | 709/224 |
| 6,239,798 B1 | 5/2001 | Ludolph et al. | |
| 6,266,645 B1 | 7/2001 | Simpson | |
| 6,272,471 B1 | 8/2001 | Segal | |
| 6,272,482 B1 * | 8/2001 | McKee et al. | 706/47 |
| 6,272,528 B1 | 8/2001 | Cullen et al. | |
| 6,314,419 B1 | 11/2001 | Faisal | |
| 6,330,551 B1 | 12/2001 | Burchetta et al. | 705/80 |
| 6,336,096 B1 | 1/2002 | Jernberg | |
| 6,341,265 B1 | 1/2002 | Provost et al. | 705/4 |
| 6,343,271 B1 * | 1/2002 | Peterson et al. | 705/4 |
| 6,370,511 B1 | 4/2002 | Dang | |
| 6,401,079 B1 | 6/2002 | Kahn et al. | 705/30 |
| 6,456,303 B1 | 9/2002 | Walden et al. | |
| 6,477,533 B2 | 11/2002 | Schiff et al. | 707/10 |
| 6,480,956 B1 | 11/2002 | DiRienzo | |
| 6,484,178 B1 | 11/2002 | Bence, Jr. et al. | |
| 6,505,176 B2 * | 1/2003 | DeFrancesco et al. | 705/38 |
| 6,584,467 B1 * | 6/2003 | Haught et al. | 707/10 |
| 6,594,697 B1 | 7/2003 | Praitis et al. | |
| 2001/0037224 A1 * | 11/2001 | Eldridge et al. | 705/4 |
| 2001/0041993 A1 * | 11/2001 | Campbell | 705/4 |
| 2002/0002475 A1 * | 1/2002 | Freedman et al. | 705/4 |
| 2002/0035488 A1 * | 3/2002 | Aquila et al. | 705/4 |
| 2002/0035491 A1 * | 3/2002 | Dombroski | 705/4 |
| 2002/0116228 A1 | 8/2002 | Baue et al. | |
| 2002/0120473 A1 * | 8/2002 | Wiggins | 705/4 |

FOREIGN PATENT DOCUMENTS

| | | |
|---|---|---|
| EP | 0 465 018 | 1/1992 |

EP  0 926 608  6/1999

OTHER PUBLICATIONS

Microsoft Corporation, "Holding State in Objects with Microsoft Transaction Server," Jun. 1997, pp. 1-3.
Microsoft Corporation, "Microsoft Component Services, Server Operating System, A Technology Overview," Aug. 15, 1998, pp. 1-7.
Howarth, "Outsourcing: Technology on Tap," Business Review Weekly, Dec. 1999, pp. 1-5.
U.S. Appl. No. 09/602,687.
U.S. Appl. NO. 09/603,130.
U.S. Appl. No. 09/603,304.
Microsoft Press Computer Dictionary 2nd Edition, Microsoft Press, Redmond WA, 1994.
"High-Performance Communication Networks"; Walrand, Jean and Pravin Varaiya; 1996; pp. 361-369; Morgan Kaufmann Publishers.
"Will your Business Model Float?"; Baatz, E.B.; Webmaster Magazine; Oct. 1996; http://www.cio.com/archive/webbusiness/100196_float_content.html.
"InsWeb Teams Up with Online Resources; Deal brings online insurance Marketplace to hundreds of financial institutions"; Dec. 2, 1998; pp. 1-3; Business Wire.
"Reliance Group providing On-Line Access to Worker's Comp, Auto, Surety, Professional Liability Coverages; E-Commerce to Exceed $100 Million in 1999"; Dec. 7, 1998; pp. 1-3; Business Wire.
Banking Flows Onto Net, Two Austin Software Companies Poised for Boom in Online Service; Ladendorf, Kirk; Becember 14, 1998; pp. 1-5; Austin American Statesman.
"Time and Billing Gets Webbed"; Antoinette, Alexander; Jun. 1, 2000; pp. 46-50; Accounting Technology, vol. 16, No. 5.
"@ Fault A Commitment to Consistency," Computer Sciences Corporation, Copyright 2000, pp. 1-2.
Borland, Russel; "Running Microsoft Outlook 97," Microsoft Press, 1997.
"The OTC Revolution"; Juhl, Randy; Mar. 3, 1997; Drug Topics 141 (5).
Mead, Jay, "Measuring the Value Added by Technical Documentation" Technical Communication Online, Aug. 1998, V. 45, N. 3.
Medisoft Insurance Claims Software Website. May 10, 2000. [Retrieved on Jan. 10, 2003] Retrieved from Interne URL: <http://web.archive.org/web/20000510094549/http://www.medisoft.com/>.
Merlin, Jr., William F., "Collision Course With the Colossus Program: How To Deal With It," The Merlin Law Group, May 2000, Tampa, FL, pp. 1-17.
Merlin, Jr., William F., "Overcoming Allstate's Trade Secrets and Work-Product Objections," The Merlin Law Group, May 2000, Tampa, FL, pp. 1-31.
Microsoft Press Computer Dictionary Second Edition, Microsoft Press, 1994, pp. 26-27, 117, 277, 335, 338, 353, 366-367, and 383.
Scopus and Entrust Technologies to Deliver World's First Secure Customer Care Solution for the Financial Service Market; PR Newswire dated Nov. 5, 1997.
Merlin, Jr., William F., "Colossus: What We Know Today," The Merlin Law Group, Aug. 2000, Tampa, FL, pp. 1-8.
https://www.foremost.com/secure/fm_claims.htm 1996.
Summary of Colossus Functionality as of Dec. 1999.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, voll. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections to the Americas, vol. 1, No. 4, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.

"The Continuum Company Announces Colossus™ Licenses," Continuum Financial News Release, The Continuum Company, Inc., Apr. 7, 1995, 1 page.

"The Continuum Company Announces Colossus License," Continuum Financial News Release, The Continuum Company, Inc., Jul. 13, 1995, 1 page.

"The Continuum Company Announces Colossus License," Continuum Financial News Release, The Continuum Company, Inc., Jul. 17, 1995, 1 page.

"The Continuum Company Announces Colossus™ Sale," Continuum Financial News Release, The Continuum Company, Inc., Oct. 9, 1995, 1 page.

"The Continuum Company Announces Colossus™ Sale To General Accident," Continuum Financial News Release, The Continuum Company, Inc., Nov. 7, 1995, 1 page.

"The Continuum Company Announces Second European Colossus Sale," Continuum Financial News Release, The Continuum Company, Inc., Jan. 5, 1996, 1 page.

"The Continuum Company Announces Colossus™ Sale," Continuum Financial News Release, The Continuum Company, Inc., Mar. 7, 1996, 1 page.

"The Continuum Company Announces Colossus License," Continuum Financial News Release, The Continuum Company, Inc., May 9, 1996, 2 pages.

"The Continuum Company Announces Colossus Sale," Continuum Financial News Release, The Continuum Company, Inc., Jun. 12, 1996, 2 pages.

"The Continuum Company Announces Colossus Sale," Continuum Financial News Release, The Continuum Company, Inc., Jul. 3, 1996, 1 page.

"CSC Continuum Announces Colossus Sale," News Release, Computer Sciences Corporation, Sep. 17, 1996, 2 pages.

"CSC Continuum Announces Colossus License," News Release, Computer Sciences Corporation, Sep. 17, 1996, 2 pages.

"CSC Continuum Announces COLOSSUS™ License," News Release, CSC Continuum, Nov. 21, 1996, 2 pages.

"USAA Licenses Colossus™," News Release, CSC Continuum, Feb. 10, 1997, 2 pages.

"20th Century Industries Licenses Colossus™," News Release, CSC Continuum, Feb. 10, 1997, 2 pages.

"Arrow Claims Management Licenses COLOSSUS™," News Release, Computer Sciences Corporation, Aug. 6, 1997, 2 pages.

"American Family Insurance Renews COLOSSUS™ License," News Release, Computer Sciences Corporation, Dec. 8, 1997, 2 pages.

"Explorer Insurance Company Licenses COLOSSUS™," News Release, Computer Sciences Corporation, Dec. 8, 1997, 2 pages.

Allstate Creates New Customer Care Center Internet Service, Apr. 13, 1999, accessed at www.allstate.com/media/newsheadlines.

Allstate Announces Online Claim Reporting Capabilities, Sep. 13, 1999, accessed at www.allstate.com/media/newsheadlines.

Greenleaf, Graham, A Colossus come to judgement: GIO's expert system on general damages, University of New South Wales (published in the Law & Information Technology column, Australian Law Journal) Nov. 26, 1992, 6 pages.

Beinat, Paul, Artificial intelligence helps boost Australian profits, Property-Casualty Insurance Edition Apr. 1997, vol. 97, Issue 12, p. 22, 2/3 p.

Attrino, Tony, Software helps bolster claims assessment, National Underwriter/ Property & Casualty Risk & Benefits, May 4, 1998, vol. 102, Issue 18, p. 14, 2p.

COLOSSUS'—A claims management system, creates standard for measuring pain/ sufering claims, Insurance Advocate, May 8, 1999, vol. 110, Issue 19, p. 25, 1/4 p.

Schwartz, Susana, CSC wraps traditional insurance solutions into a neat new package, Insurance and Technology, Sep. 1998, vol. 23, Issue 9, p. 61, 2p.

Bremer, Christine, and Lance Trollop, Colossus: What Colossus is and what it does, accessed at http://www.watl.org.Verdict%20articles/colossus.htm on May 6, 2004.

Scopus and Entrust: Call Center Sales Helper is Unveiled, Nov. 10, 1997; vol. 162, Issue 217, p. 19.

International search report application No. PCT/US01/ 20030, mailed Nov. 1, 2001, 5 pages.

Australian patent application 2001268693—Examiner's first report on patent application, Apr. 21, 2006.

http://web.archive.org/web/20000605062238/http://www.wawanesa.com/insure_claims_process.htm, (Wawanesa Insurance) Jun. 5, 2000.

U.S. Appl. No. 09/603,307.
U.S. Appl. No. 09/603,129.
U.S. Appl. No. 09/603,308.
U.S. Appl. No. 09/603,144.
U.S. Appl. No. 09/603,662.
U.S. Appl. No. 09/603,302—Claims Only, Specification and Figures are similar to U.S. Appl. No. 09/603,662.
U.S. Appl. No. 09/602,691—Claims Only, Specification and Figures are similar to U.S. Appl. No. 09/603,662.
U.S. Appl. No. 09/603,306.
U.S. Appl. No. 10/285,292.
U.S. Appl. No. 09/285,289—Claims Only, Specification and Figures are similar to U.S. Appl. No. 10/285,292.
U.S. Appl. No. 10/285,339—Claims Only, Specification and Figures are similar to U.S. Appl. No. 10/285,292.
U.S. Appl. No. 10/285,375—Claims Only, Specification and Figures are similar to U.S. Appl. No. 10/285,292.
U.S. Appl. No. 10/285,338—Claims Only, Specification and Figures are similar to U.S. Appl. No. 10/285,292.
U.S. Appl. No. 10/285,293—Claims Only, Specification and Figures are similar to U.S. Appl. No. 10/285,292.
U.S. Appl. No. 10/422,632.
U.S. Appl. No. 10/422,450—Claims Only, Specification and Figures are similar to U.S. Appl. No. 10/422,632.

* cited by examiner

INTERNET-ENABLED SYSTEM AND METHOD FOR ASSESSING DAMAGES

BACKGROUND OF THE INVENTION

1. Field of the Invention

The present invention relates to computer software, and more particularly to insurance claim processing software.

2. Description of the Related Art

Insurance companies have been processing and settling claims associated with bodily injury for a long time. The task of evaluating, analyzing or estimating the amount of damage associated with one or more types of bodily injuries, especially trauma-induced bodily injuries, can be very complex. Complexity in the evaluation process often arises out of the fact that concurrent expertise in legal, medical and insurance fields is often required to arrive at a particular decision involving a bodily injury claim.

Several factors can affect the estimated amount of the claim associated with a bodily injury. Every accident is different and every injury is unique. Arriving at a customized evaluation of a bodily injury claim, which is unique for a specific accident, injury, etc. is desirable. Applying across-the-board standards may tend to result in an inequitable solution for one or more parties involved. External environmental factors, such as the experience level of a claims adjuster, record of accomplishment of the legal professionals, post-injury quality of life for the injured party, etc., all can affect the valuation of a claim.

During the past several years, many insurance companies have been using computer-based and knowledge-based claim-processing systems to process, evaluate, analyze and estimate thousands of claims in a fair and consistent manner. A knowledge-based claim-processing system includes an expert system which utilizes and builds a knowledge base to assist the user in decision making. It may allow the insurance companies to define new rules and/or use previously defined rules, in real-time. The business rules are generally written by industry experts to evaluate legal, medical, insurance conditions before arriving at a valuation of a claim.

In knowledge-based systems, to estimate a claim for bodily injury, the user may enter inputs on a display screen and step through a series of displays or screens to complete the data input process. This process may be referred to as a consultation session. The knowledge-based claim processing system may then utilize the user-provided inputs to generate a consultation report. The consultation report may include, for example, an estimate of a value of an insurance claim.

In the past, such knowledge-based systems for estimating the value of an insurance claim have been limited to traditional computing architectures such as mainframes and stand-alone personal computers. Therefore, it was necessary to install and maintain client software as well as server software for these knowledge-based systems in particular physical locations. With the growth of the Internet, however, many personal computers may now be granted client access to servers distributed all over the world.

It may therefore be desirable to develop a knowledge-based system for insurance claim processing which is configured to be accessed over the Internet. It may also be desirable to develop a knowledge-based system for insurance claim processing which is configured to be accessed through a web browser. It may be desirable to develop new business models for providing insurance companies with access to a web-based or internet-based insurance claim processing server.

SUMMARY OF THE INVENTION

The present invention provides various embodiments of an Internet-enabled method and system for processing insurance claims. The system may include an insurance claim processing server which may include a first CPU and a first memory coupled to the first CPU. The first memory may stores a first set of program instructions which are executable by the first CPU to estimate a value of an insurance claim as a function of insurance claim assessment data entered by a user during an insurance claim consultation session. The insurance claim may include a bodily injury claim, and the estimate of the value of the insurance claim may include an estimate of bodily injury general damages. The insurance claim assessment data may include one or more bodily injuries and one or more treatments of the bodily injuries. The first set of program instructions may include a rules engine and a web server. The first set of program instructions may be further executable by the first CPU to generate and send to a client computer system a plurality of web pages comprising insurance claim assessment questions.

The system may also include a client computer system which may include a second CPU and a second memory coupled to the second CPU. The client computer system may be coupled to the insurance claim processing server through a network. The network may include the Internet, and the insurance claim processing server and the client computer system may therefore be operable to communicate over the network via TCP/IP. The second memory may store a second set of program instructions which are executable by the second CPU to receive the insurance claim assessment data entered by the user and send the insurance claim assessment data across the network to the insurance claim processing server. The second set of program instructions may include a web browser. The second set of program instructions may be further executable by the second CPU to display the web pages comprising the insurance claim assessment questions during the insurance claim consultation session.

In one embodiment, the system may include additional client computer systems such as a second client computer system including a third CPU and a third memory. The second client computer system may be coupled to the insurance claim processing server through the network. The third memory may store a third set of program instructions, such as a second web browser, which are executable by the third CPU to receive a second set of insurance claim assessment data entered by a second user. The third set of program instructions may be further executable to send the second set of insurance claim assessment data across the network to the insurance claim processing server. The first set of program instructions may be further executable to estimate a value of a second insurance claim as a function of the second set of insurance claim assessment data entered by the second user during a second insurance claim consultation session.

Figure 1:
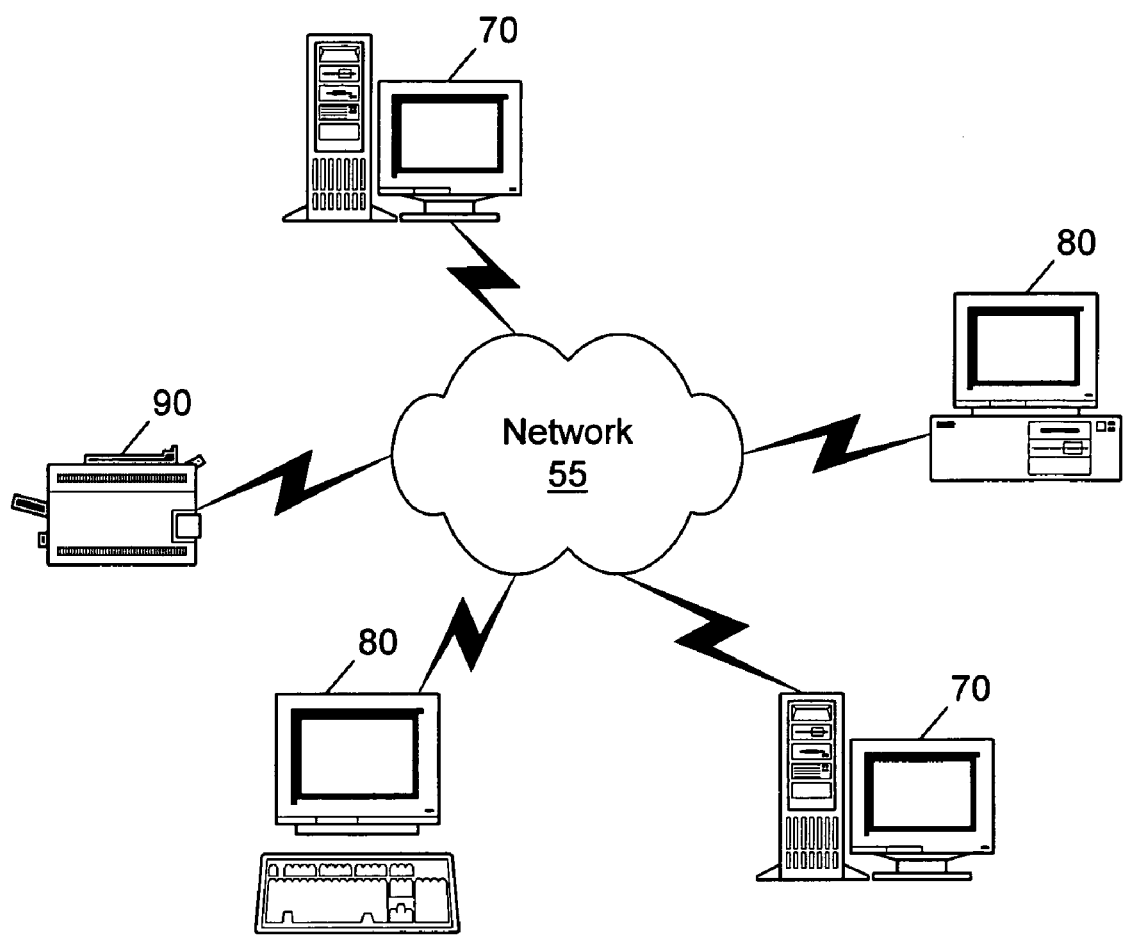
FIG. 1 is a network diagram of an illustrative distributed computing environment which is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1: A Distributed Computing Environment

FIG. 1 is a network diagram of an illustrative distributed computing environment which is suitable for implementing various embodiments. The distributed computing environment may include various server systems 70 and client systems 80 connected by a network 55. Other networkable devices such as printers 90 may also be connected to the network 55. The servers 70, clients 80, and other devices may be geographically dispersed. A single computer system may server as both a server and client.

The network 55 may be a local area network or wide area network, and may include communications links including, but not limited to: Ethernet, token ring, Internet, satellite, wireless, telephone, cable, DSL, and other suitable pathways. As used herein, "the Internet" includes one or more substantially global networks which are generally accessible by the public (i.e., they are not proprietary or not largely characterized by controlled access). Various sources of data on the Internet may be accessed through protocols such as HTTP (HyperText Transport Protocol), HTTPS (Secure HyperText Transport Protocol), FTP (File Transfer Protocol), Telnet, NNTP (Network News Transport Protocol), SMTP (Simple Mail Transfer Protocol), and other suitable protocols. Transmission of data over the Internet is typically achieved through the use of TCP/IP (Transmission Control Protocol/Internet Protocol) packets.

Figure 2A:
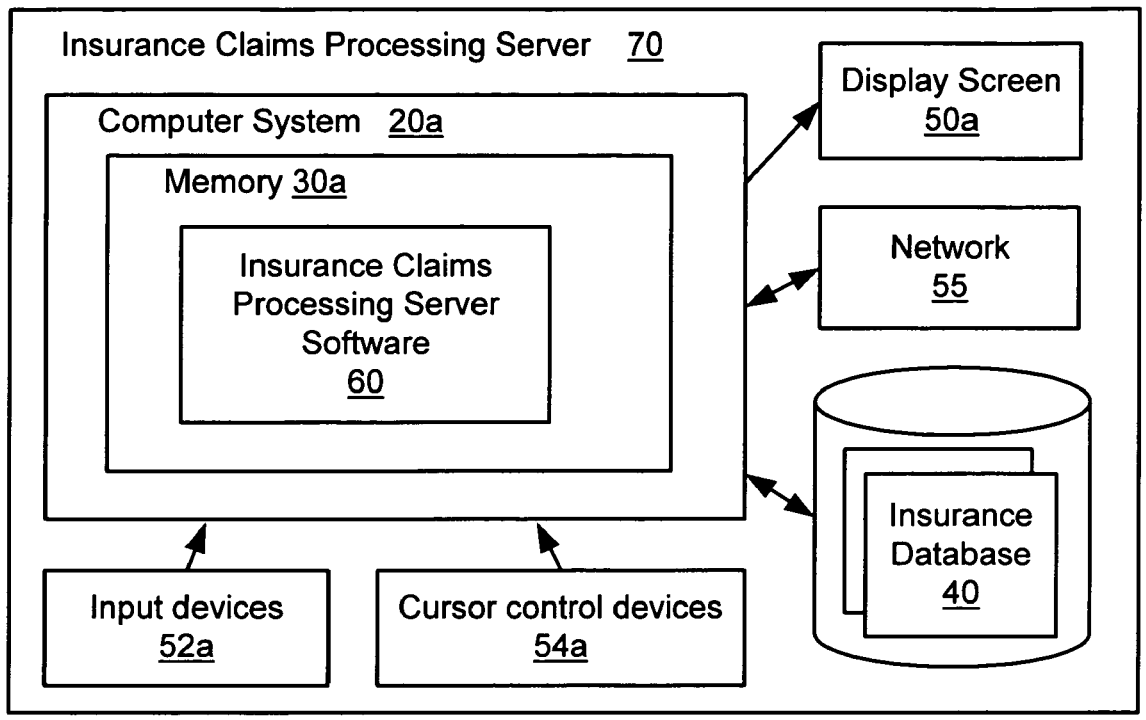
FIG. 2a is an illustration of an insurance claims processing server computer architecture according to one embodiment.
Figure 2B:
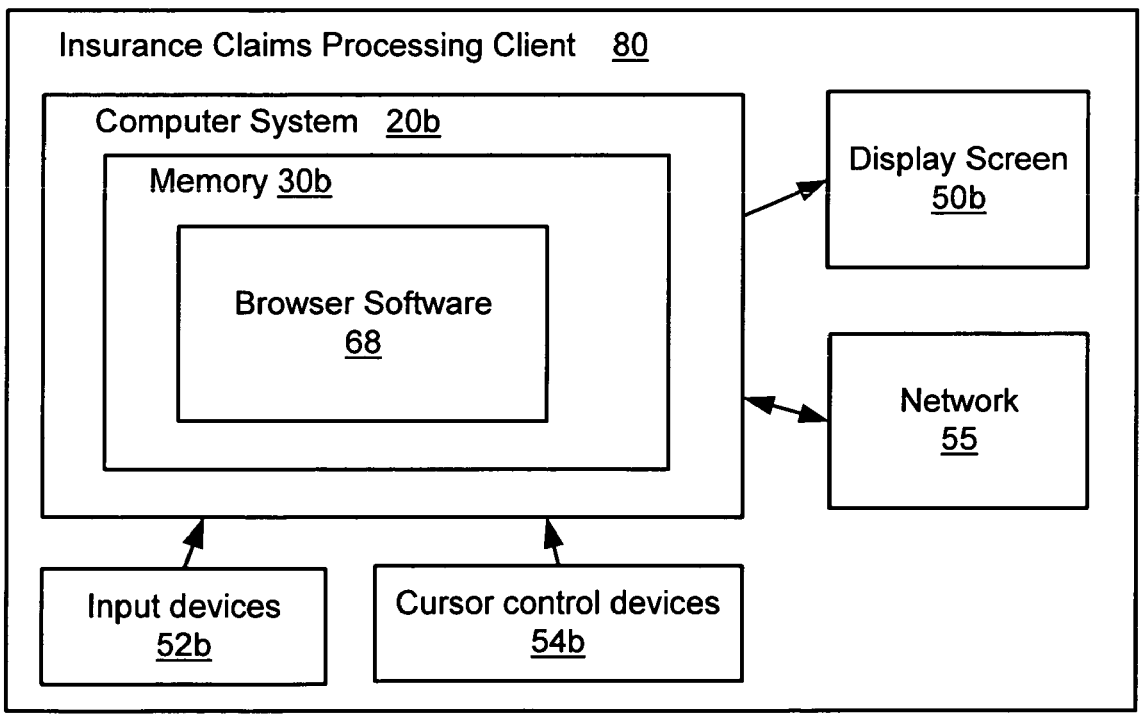
FIG. 2b is an illustration of an insurance claims processing client computer architecture according to one embodiment.

FIGS. 2a and 2b: An Insurance Claims Processing Server Computer Architecture and an Insurance Claims Processing Client Computer Architecture FIG. 2a is an illustration of an insurance claims processing server computer architecture according to one embodiment. FIG. 2b is an illustration of an insurance claims processing client computer architecture according to one embodiment.

The insurance claims processing server 70 may include a computer system 20a with a memory 30a. The insurance claims processing client 80 may include a computer system 20b with a memory 30b. The term "computer system" as used herein generally includes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "CPU" is used synonymously with "processor" herein. The term "memory" is used synonymously with "memory medium" herein. The term "memory medium" is intended to include an installation medium, e.g., a CD-ROM, or floppy disks, a volatile computer system memory such as DRAM, SRAM, EDO RAM, Rambus RAM, etc., or a non-volatile memory such as optical storage or a magnetic medium, e.g., a hard drive. The memory medium may comprise other types of memory as well, or combinations thereof. In addition, the memory medium may be located in a first computer in which the programs are executed, or may be located in a second different computer that connects to the first computer over a network 55. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for processing insurance claims as described herein. The software program(s) may be implemented in any of various ways, including procedure-based techniques, component-based techniques, and/or object-oriented techniques, among others. For example, the software programs may be implemented using a rule-based development tool such as PLATINUM Aion™ available from Computer Associates International, Inc. In one embodiment, PLATINUM Aion™ may combine business rule and object-oriented technologies to create and maintain complex, knowledge-intensive applications. Software developed with PLATINUM Aion™ may employ an Aion™ programming language for automation of processes which may use hundreds or thousands of business rules from a knowledge base. An Aion™ inference engine may automatically determine which rules to execute, when, and in what order. In various other embodiments, the software program may be implemented using other technologies, languages, or methodologies, as desired. A CPU, such as the host CPU, executing code and data from the memory medium includes a means for creating and executing the software program or programs according to the methods, flowcharts, and/or block diagrams described below.

Various embodiments further include receiving or storing instructions and/or data implemented in accordance with the description herein upon a carrier medium. Suitable carrier media include memory media or storage media such as magnetic or optical media, e.g., disk or CD-ROM, as well as transmission media or signals such as electrical, electromagnetic, or digital signals, conveyed via a communication medium such as network 55 and/or a wireless link.

A computer system's software generally includes at least one operating system, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as required by a program.

A server may be defined as a computer program that, when executed, provides services to other computer programs (referred to as clients) executing in the same or other computer systems. The computer system on which a server program is executing may also be referred to as a server, though it may contain a number of server and client programs. In the client/server model, a server is a program that awaits and fulfills requests from client programs in the same or other computer systems.

The insurance claims processing server 70 may further include a display device 50a connected to the computer system 20a and an insurance database 40 residing on an internal or external storage. As used herein, a "database" may include a collection of information from which a computer program may select a desired piece of data. As used herein, an "insurance database" is used as a synonym for a "database" when included in or coupled to an insurance claims processing system. Computer system 20a includes memory 30a configured to store computer programs for execution on the computer system 20a and a central processing unit (or CPU, not shown) configured to execute instructions of computer programs residing on the computer system 20a. Insurance claims processing server software 60 may be stored in the memory 30a. As used herein, an "insurance claims processing program" 60 or "insurance claims processing software" or "insurance claims processing system" may include a software program which is configured to conduct transactions regarding insurance claims, such as by estimating the value of the insurance claims, for example.

The insurance claims processing client 80 may further include a display device 50b connected to the computer system 20b. Computer system 20b includes memory 30b configured to store computer programs for execution on the computer system 20b and a central processing unit (or CPU, not shown) configured to execute instructions of computer programs residing on the computer system 20b. Insurance claims processing client software 68, such as web browser software, may be stored in the memory 30b.

The insurance claims processing server 70 may be connected to network 55. The insurance claims processing server software 60 and insurance database 40 may be distributed among the one or more servers 70 to provide a distributed processing system for insurance claim transactions. In other words, an insurance claim processing transaction being processed by the insurance claim processing system may be routed to any server based upon the workload distribution among servers 70 at the time of the transaction. Insurance claim processing system servers 70 may be located on a local area network or may be geographically dispersed in a wide area network.

One or more clients 80 may also be connected to network 55. Clients 80 may reside at one or more claim processing units within the insurance company. In a wide area network, clients 80 may be geographically dispersed. Clients 80 may be used to access one or more insurance claim processing system servers 70 and associated insurance databases 40. An insurance claim processing employee may use a client 80 to access the insurance claim processing system and execute insurance transactions. An employee may also use a client 80 to enter insurance claim inputs into the insurance claim processing system. As shown in FIG. 1, one or more printers 90 may also be connected to network 55 for printing documents associated with insurance claim transactions.

The insurance claims processing server 70 and client 80 may be used by an Insurance Company for various embodiments of a system and method for processing insurance claims. As used herein, an Insurance Company (IC) includes a business organization that provides insurance products and/or services to customers. More particularly, the insurance products may pertain to providing insurance coverage for accidents and the trauma-induced bodily injuries that may result due to the accident. Examples of trauma-induced bodily injuries may include, but are not limited to: loss of limb(s); bone fractures; head, neck and/or spinal injury, etc.

In one embodiment, on receiving a trauma-induced bodily injury, a customer may file an insurance claim (IC) with his/her insurance organization to cover medical and other accident-related expenses. An IC may utilize a computer-based insurance claim processing system to process insurance claims. In one embodiment, the processing may include estimating a value, including a bodily injury general damages amount, associated with the filed insurance claim.

As used herein, an IC business transaction may be defined as a service of an IC. Examples of business transactions include, but are not limited to: insurance transactions such as filing of claims, payment of claims, application for insurance coverage, and customized benefits, etc. Business transactions may also include services related to customers, insurance providers, employers, insurance agents, investigators, etc.

As used herein, an IC insurance claim processing system includes a series of instructions executed by a computer system 70 and/or 80 for processing an IC's business transactions. A claim processing system may include one or more processing tasks. A processing task may include a sequence of one or more processing steps or an ordered list or a structured list of one or more processing steps which associated with the business transaction to be processed by the claim processing system. In one embodiment, the sequence of steps may be fixed. In another embodiment the sequence of steps may be established dynamically, in real-time. In one embodiment, the sequence of one or more steps may include an initial step, a final step, one or more intermediary steps, etc. In one embodiment, an IC user may select steps to process an insurance claim in a sequential manner. In another embodiment, the IC user may select steps to process an insurance claim in a random or arbitrary manner. Examples of processing steps may include, but are not limited to: receiving an input from a user of the IC insurance claim processing system 70 and/or 80, reading a value from a database, updating a field in a database, displaying the results of a business transaction on a computer screen, etc.

In one embodiment, the insurance claim processing system 70 and/or 80 utilizes object-oriented technology to process insurance claims. In another embodiment, processing of insurance claims may utilize traditional programming languages and databases to achieve the same result. Insurance objects may be defined to represent or model real-world business features of insurance products and services. Examples of insurance objects may include, but are not limited to, objects representing the following: an insurance claim; an accident report; a settlement; an estimated claim; IC service facilities, customers, and employees; business process such as a new insurance application and calculation of a premium; interfaces to external insurance organizations; work tasks such as calculations, decisions, and assignments; temporal objects such as calendars, schedulers, and timers; and elemental data necessary to accomplish work tasks such as medical costs, risk factors, etc.

An insurance object may be represented on the computer screen 50a and/or 50b by a graphical icon or by a display listing the properties of the insurance object in graphic and/or alphanumeric format. An insurance claim object may be configured to gather and evaluate data for processing a filed insurance claim and to automatically make decisions about the insurance claim. The one or more processing steps associated with the processing of an insurance claim may also be configured as one or more processing step objects. In one embodiment, a display screen, which also may be referred to as a page, may be associated with a processing step. The display screen may also be represented as an object. Each display screen object may include a property to point to a previous display and another property to point to a next display screen. Each property, e.g. the next display pointer on a display screen object, may be changed dynamically by using methods associated with the display screen object. One display screen object may serve as the starting point for processing insurance claims. In one embodiment, the starting point for processing insurance claims may include acquiring an insurance claim identification number from an IC system user.

In one embodiment, during the processing of an insurance claim, a business rule and/or an IC system user input may determine that the insurance claim processing needs the execution of additional steps or tasks to continue the processing of the claim. The IC system user may provide inputs to the insurance claims processing server software 60 at any display screen associated with a step included in a Table of Contents. The insurance claim processing software may dynamically modify the number of steps and/or the sequence of their execution to complete the claim processing transaction. An IC system user working at a client system 20b may then iterate through the claim processing steps and arrive at an estimated value for the insurance claim.

In one embodiment, upon startup, the server software 60 and browser software 68 may provide a graphical user interface to display claims processing related information on display device 50a and/or 50b. It may collect user inputs which are associated with insurance claims and entered by using user input devices 52a and/or 52b. It may process the user inputs, access an insurance database 40, use the contents of the insurance database 40 to estimate the insurance claim, and store it in memory 30a and/or 30b and/or insurance database 40. The browser 68 may display a value of the estimated insurance claim on display screen 50b. A user may view the display of the estimated insurance claim on display screen 50b and may interactively make modifications, additions, and deletions to the estimated insurance claim.

Systems 20a and 20b may also include one or more user input devices 52a and 52b, such as a keyboard, for entering data and commands into the insurance claim program 60. It may also include one or more cursor control devices 54a and 54b such as a mouse for using a cursor to modify an insurance claim viewed on display screen 50a and/or 50b. In response to the updating of the estimated insurance claim, the insurance claim server software 60 may store the updated insurance claim in the insurance database 40.

Figure 3A:
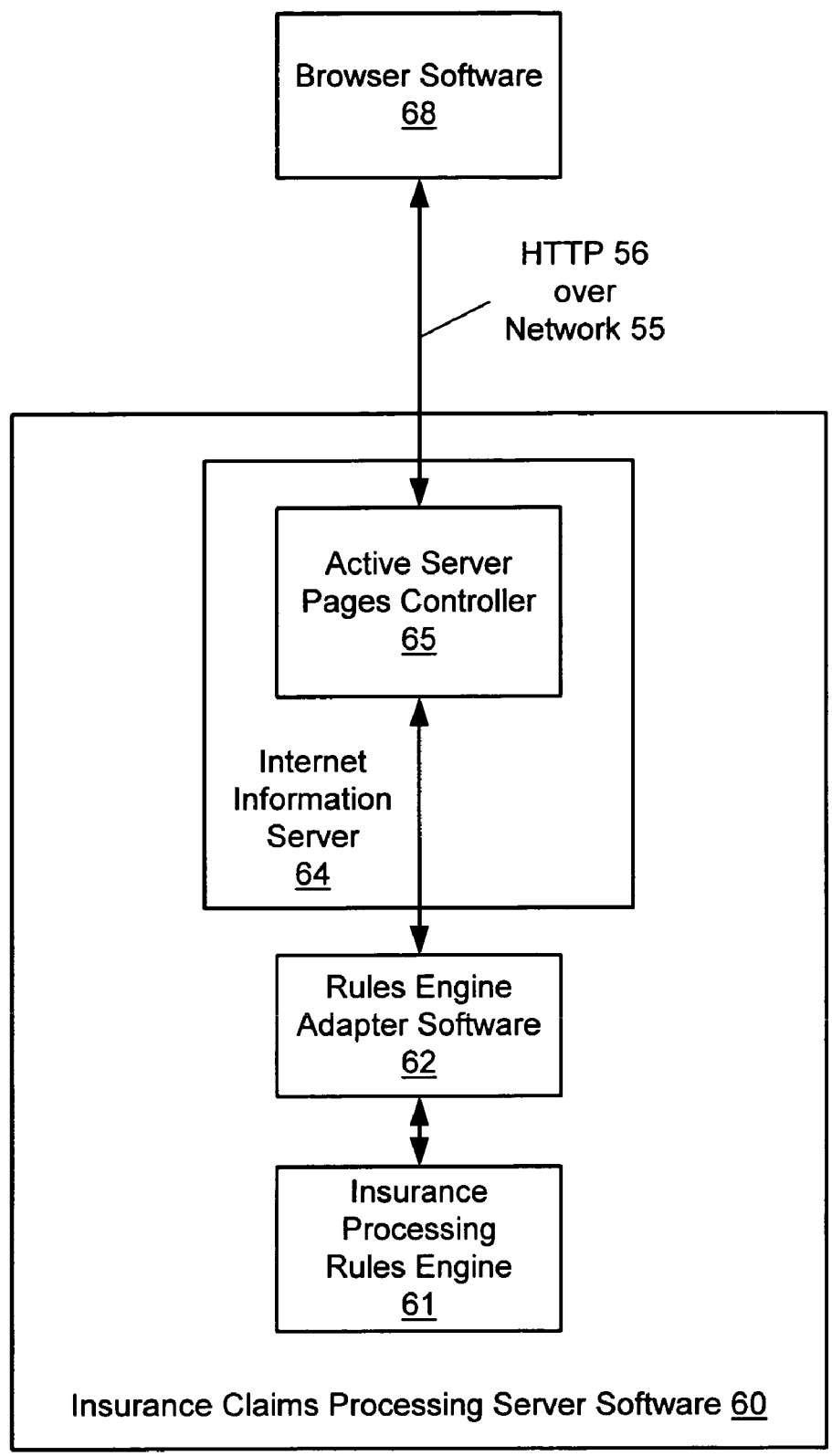
FIG. 3a is an illustration of an insurance claims processing server software architecture for a single client according to one embodiment.

FIG. 3a: An Insurance Claims Processing Server Software Architecture

FIG. 3a is an illustration of an insurance claims processing server software 60 architecture for a single client according to one embodiment. The server software 60 may include an insurance processing rules engine 61. As used herein, a "rules engine" may include an expert system which is operable to produce an output as a function of a plurality of rules. A rules engine, in one embodiment, may include an expert computer system which utilizes and builds a knowledge base developed in the form of business rules and/or formulas to assist the user in decision-making. In one embodiment, the rules engine 61 is operable to generate insurance claim assessment questions to be displayed to a user during an insurance claim consultation session. The rules engine 61 may also be operable to estimate a value of an insurance claim as a function of insurance claim assessment data entered by a user in response to the insurance claim assessment questions. In one embodiment, the insurance claim may include a bodily injury claim, the insurance claim assessment questions may include bodily injury claim assessment questions, the insurance claim assessment data may include bodily injuries and treatments thereof.

In one embodiment, the rules engine 61 is capable of processing rules associated with assessing bodily injury damages claims. A rules engine 61, in one embodiment, comprises an expert computer system which utilizes and builds a knowledge base developed in the form of business rules to assist the user in decision-making. It allows the insurance companies to capture the knowledge base of their experts by defining business rules. Once created, the expertise may be used in processing many transactions, including assessing bodily injury damages claims. The business rules enable claim-processing professionals to be assisted by industry experts to evaluate legal, medical, insurance conditions before arriving at a valuation of an insurance claim.

In various embodiments, the rules engine 61 may be implemented and executed on various computing platforms such as personal computers and mainframes. The rules engine 61 may comprise a rules engine executable file on these platforms. In various embodiments, the rules engine may be accessed through various user interfaces, such as a graphical user interface for a rules engine 61 which is executable on a Microsoft™ Windows™-based server 70. In one embodiment, the rules engine 61 may be developed using a commercial rule-based development tool such as PLATINUM Aion™, which is available from Computer Associates International, Inc. In one embodiment, the rules may be customized to meet the requirements of a particular insurance company.

Business rules, often referred to simply as rules, may include executable computer program instructions. The rules include computer commands or logical instructions to achieve a certain function. For example, rules may guide an assessment or estimate of bodily injury general damages. Each rule, in one embodiment, includes a premise followed by one or more resulting actions. For example, in one embodiment, a business rule may state 'If patient requires hospitalization after emergency care treatment then the trauma severity level should be classified as major'. In this case, the premise is 'patient requires hospitalization after emergency care treatment'. The resulting action is 'trauma severity level should be classified as major'. In one embodiment, the insurance claim processing server 70 may include several thousand business rules. The rules may be executed or fired, under the control of the insurance claim processing software, based on certain events, user inputs, etc. Only pertinent rules, i.e., a subset of all the available rules, are typically selected and executed for processing a specific bodily injury damages claim. On execution of the plurality of rules which are applicable to a specific bodily injury claim consultation session, the insurance claim processing server software 60 may generate a consultation report which summarizes an assessment and/or estimate of the bodily injuries claim.

The rules may be stored in and retrieved from an insurance database 40. The type of information stored and/or retrieved may include, but not be limited to, business objects, tables, rules, software source code, executable software, etc. In one embodiment, the database may include a relational database. In another embodiment, the database 40 may include an object-oriented database.

In one embodiment, the insurance claims processing server software 60 may include adapter software 62 which may provide access to the rules engine for one or more other computer-based applications or subsystems, such as an internet information server 64. In one embodiment, the adapter software 62 provides an application programming interface (API) to the rules engine 61. The adapter software 62 is discussed in greater detail with reference to FIG. 4.

In one embodiment, the insurance claims processing server software 60 may include a web server such as an internet information server (IIS) 64. As used herein, a "web server" includes a system for supplying clients with access to web pages, such as by sending the pages to clients via an appropriate protocol. In one embodiment, a web server may also be operable to generate the web pages dynamically. As used herein, a "web page" includes a block of information which is configured to be displayed by a web browser 68. As used herein, a "web browser" or "browser software" includes software which is configured to receive and display web pages. Examples of web browsers include Internet Explorer™ available from Microsoft™ Corporation and Netscape Navigator™ available from Netscape Communications Corporation. Typically, a web page is configured to be displayed in a single window in a web browser, wherein the window may be scrolled to view off-screen elements of the web page. Web pages may include various combinations of text, graphics, audio content, video content, and other multimedia content. A web page is often encoded in a language such as HTML (HyperText Markup Language). Web pages may be viewed in a browser on the same computer system on which the server 64 or web pages reside. Web pages may also be transmitted to a client computer system over a network 55, such as via the HyperText Transport Protocol (HTTP) 56. Where the network 55 includes the Internet, the web pages may be transmitted via standard protocols such as TCP/IP.

In one embodiment, the internet information server (IIS) 64 may include a commercial product such as Microsoft™ Internet Information Server available from Microsoft™ Corporation. In one embodiment, the server 64 may include an active server pages (ASP) controller 65 which is operable to generate web pages dynamically. In other words, the web pages delivered by the internet information server 64 may be built in real time by the ASP controller 65 upon a request for a page by a browser 68. Active server pages may include dynamic web pages which are created, for example, by blending HTML and server-side scripting. Active server pages may be dynamically constructed to include insurance claim assessment questions and other user interface elements by starting from a template.

The web server 64 may be configured to generate a plurality of web pages comprising the insurance claim assessment questions. The web browser 68 may then be configured to display the plurality of web pages comprising the insurance claim assessment questions. The web browser 68 may then be configured to receive insurance claim assessment data entered by a user in response to the insurance claim assessment questions during an insurance claim consultation session and send the insurance claim assessment data to the web server 64. In one embodiment, the web server 64 is further configured to receive the insurance claim assessment data from the web browser 68 and send the insurance claim assessment data to the rules engine 61. The rules engine 61 may be further configured to generate and send the estimate of the value of the insurance claim to the web browser 68 through the web server 64. The web browser 68 may be further configured to display the estimate of the value of the insurance claim received from the rules engine 61 through the web server 68.

In one embodiment, the web server 64 and web browser 68 may be located on separate computer systems which are communicatively coupled through a network 55. In another embodiment, the web server 64 and web browser 68 may be located and executed on a single computer system.

Figure 3B:
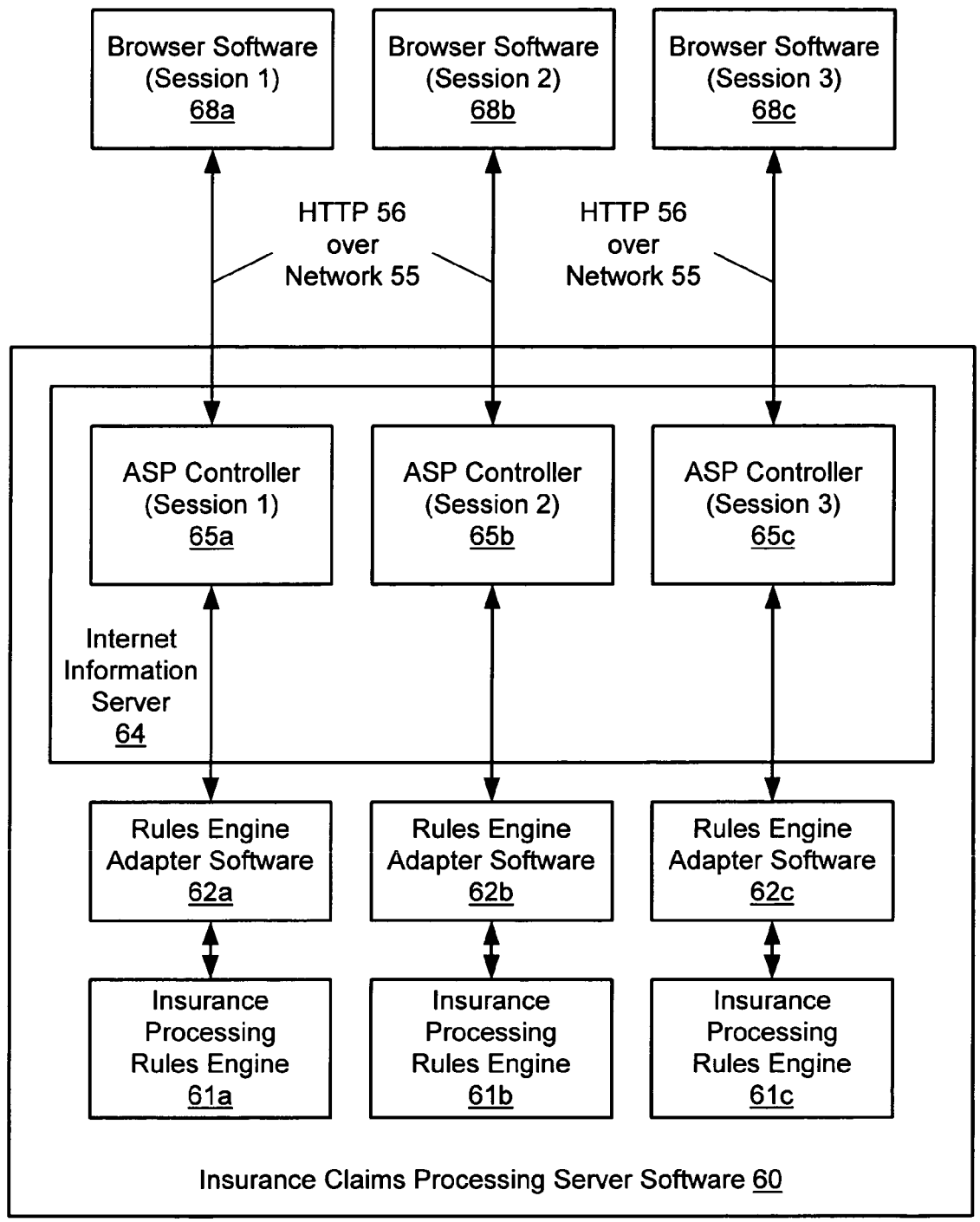
FIG. 3b is an illustration of an insurance claims processing server software architecture for multiple clients according to one embodiment.

FIG. 3b: An Insurance Claims Processing Server Software Architecture

HTTP is considered to be a stateless internet access protocol. In other words, each request from a web browser 68 to a web server 64 is essentially a request-response interaction. Therefore, when a web browser 68 requests a web page, for example, the web server 64 may complete the interaction between the two by sending the page to the browser 68. However, a consultation session conducted by a user through a web browser 68 which communicates with the rules engine 61 may include many successive interactions through the web server 64. It would tend to be inefficient to start a rules engine executable file for each of the many interactions that may take place during a single consultation session.

Therefore, IIS sessions may be used to maintain resources and state for each of a plurality of users. FIG. 3b is an illustration of an insurance claims processing server software architecture for multiple clients 68a, 68b, 68c according to one embodiment. The first time a user connects to a suitable web site provided by the server 64, a rules engine may be executed or started for that particular user and then "held" in an IIS session for that user. FIG. 3b illustrates an example including three browsers 68a, 68b, 68c which correspond to and communicate with respective rules engines 61a, 61b, 61c. Each IIS session may include an individual ASP controller 65a, 65b, 65c. Each rules engine 61a, 61b, 61c may therefore be linked to its corresponding ASP controller 65a, 65b, 65c through individual adapter software 62a, 62b, 62c.

Figure 4:
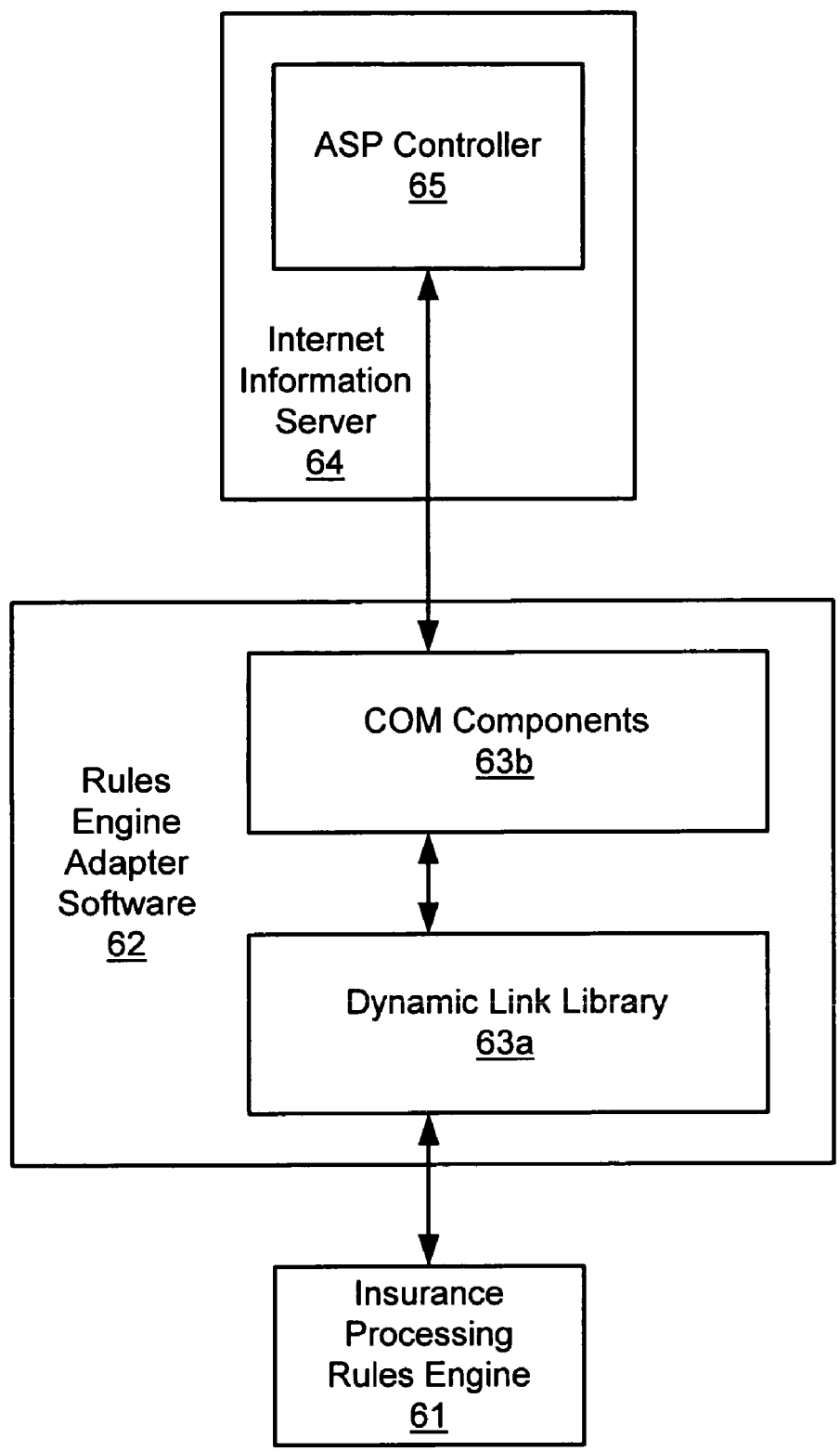
FIG. 4 is an illustration of adapter software between a rules engine and a web server according to one embodiment.

FIG. 4: Adapter Software

FIG. 4 is an illustration of adapter software between a rules engine and a web server according to one embodiment. The adapter software 62 may include one or more components which permit software such as applications or other components to communicate with the rules engine 61. For example, the adapter software may provide methods to start and communicate with a rules engine executable file 61.

As used herein, a component is a software object which includes definitions of method of communication for that software object. Typically, components are implemented according to a component architecture specification such as the Component Object Model (COM) or Distributed Component Object Model (DCOM) promulgated by Microsoft™. The component architecture specification for COM enables applications and components which follow the specification to pass data, commands, and other information back and forth. A COM interface may be said to "wrap" an object, server, or other piece of software if that COM interface defines methods of interaction or communication with that object, server, or piece of software.

In one embodiment, the adapter software 62 may include one or more COM components 63b and a dynamic link library (DLL) 63a. As used herein, a DLL may include a library of executable functions or data that can be used by an application such as a Microsoft™ Windows™-based application. Typically, a DLL provides one or more particular functions, and a program may access those functions by creating either a static or dynamic link to the DLL. A static link remains constant during program execution, while a dynamic link is created by the program as needed. In one embodiment, the DLL 63a may provide a lower-level interface to the functions and methods of the rules engine 61. For example, the DLL 63a may take advantage of published protocols for accessing a rules engine implemented with a commercial system such as PLATINUM Aion™. In one embodiment, the DLL 63a may be provided by the supplier of the commercial system for developing a rules engine.

The COM component(s) 63b may then provide a higher-level interface to the DLL 63a, which in turn may provide an interface to the rules engine 61. In other words, the "business intelligence" may be confined to the rules engine 61 and DLL 63a, and the COM component(s) 63b may expose an interface which permits other pieces of software to convert data, requests, and other parameters to function calls provided by the DLL 63a. In one embodiment, the COM component(s) 63b may include methods including, but not limited to, the following: setListParameter, setSingleParameter, getNextMessage, lastErrorMessage, sendMessage, terminateSession, transactMessage, getListParameter, getSingleParameter, startServerSession, and startRefsysSession. Appropriate parameters may be defined for each method.

Figure 5:
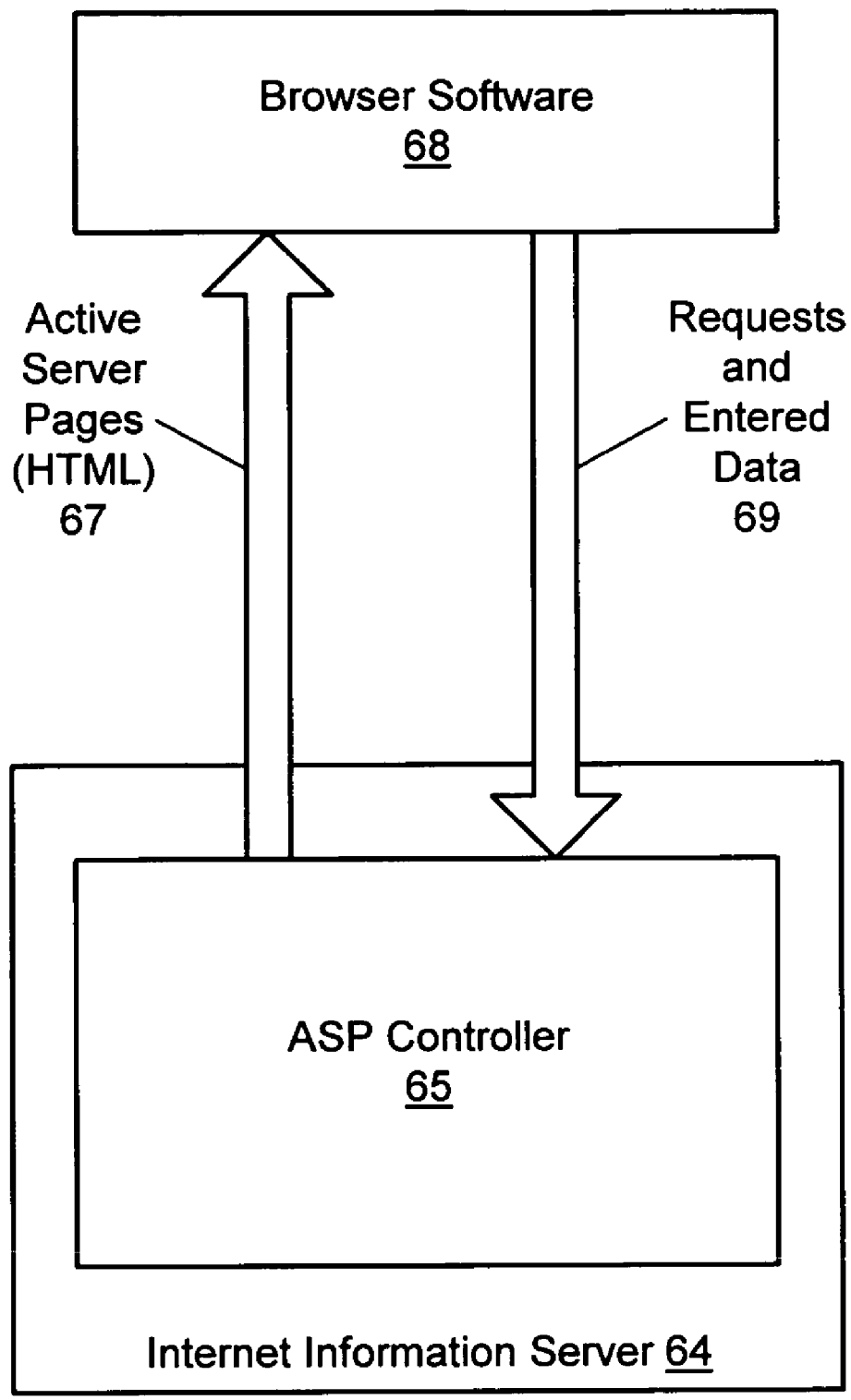
FIG. 5 illustrates the transmission of data between a web server and a web browser according to one embodiment.

FIG. 5: Transmission of Data Between a Web Server and a Web Browser

FIG. 5 illustrates the transmission of data between a web server and a web browser according to one embodiment. Each ASP controller 65 may be a web-specific COM component or components that may run in a process space associated with the IIS 64. These components may be operable to start, stop, and send data 69 (such as insurance claim consultation data entered in response to insurance claim consultation questions) to the rules engine 61. These components may also be operable to receive data (such as insurance claim consultation questions and elements of the user interface) from the rules engine 61 for inclusion in one or more web pages 67. Generally, these components are configured to translate data between HTML on the IIS 64 side and the interface exposed by COM components 63b on the other side. These components may include functionality such as data validation (e.g., determining if datatypes of entered data are valid). The components may also ensure that the state of the interactions or "conversation" between a rules engine and a browser is preserved, as discussed in greater detail with respect to FIG. 4b and FIG. 9.

In one embodiment, the ASP controller 65 may include at least two COM components: one which handles interactions between a web browser 68 and the rules engine executable file, and another which handles interactions between the web browser 68 and a reference system or help system executable file. The reference system executable file may provide the user with detailed assistance in conducting an insurance claim consultation session.

In one embodiment, the COM component(s) for accessing the reference system may include methods including, but not limited to, the following: addedRefsysID, initializeContentsGraphs, startSessionIfNecessary, MemberOftrueHierarchyIds, lastSearchText, lastSelectedChapterObjectId, terminateSession, getFirstMessage, pageHasError, getListParameter, chapterWasSelected, writeRefsysContents, writeContextContents, writeSearchResults, writeHelpTextAsHTML, contextHelpWasSelected, isSessionStarted, searchHitWasSelected, mergeLostBoys, searchWasSelected, and iisSessionId. Appropriate parameters may be defined for each method.

In one embodiment, the COM component(s) for accessing the rules engine 61 may include methods including, but not limited to, the following: terminateSession, startSessionIfNecessary, writePredisplayHtml, handleExitProcessing, getFirstMessage, pageToShow, errorMessage, pageHasError, pageWasPosted, doPageTransaction, getSingleParameter, getListParameter, getListParameterNoTrim, debugIt, formatAdsDate, hasSaveButton, hasBackButton, hasNextButton, hasContentsButton, hasCommentsButton, hasUnknownButton, hasReportButton, claimKeyFormat, statusMessage, iisSessionId, and isSessionStarted. Appropriate parameters may be defined for each method.

Figure 6:
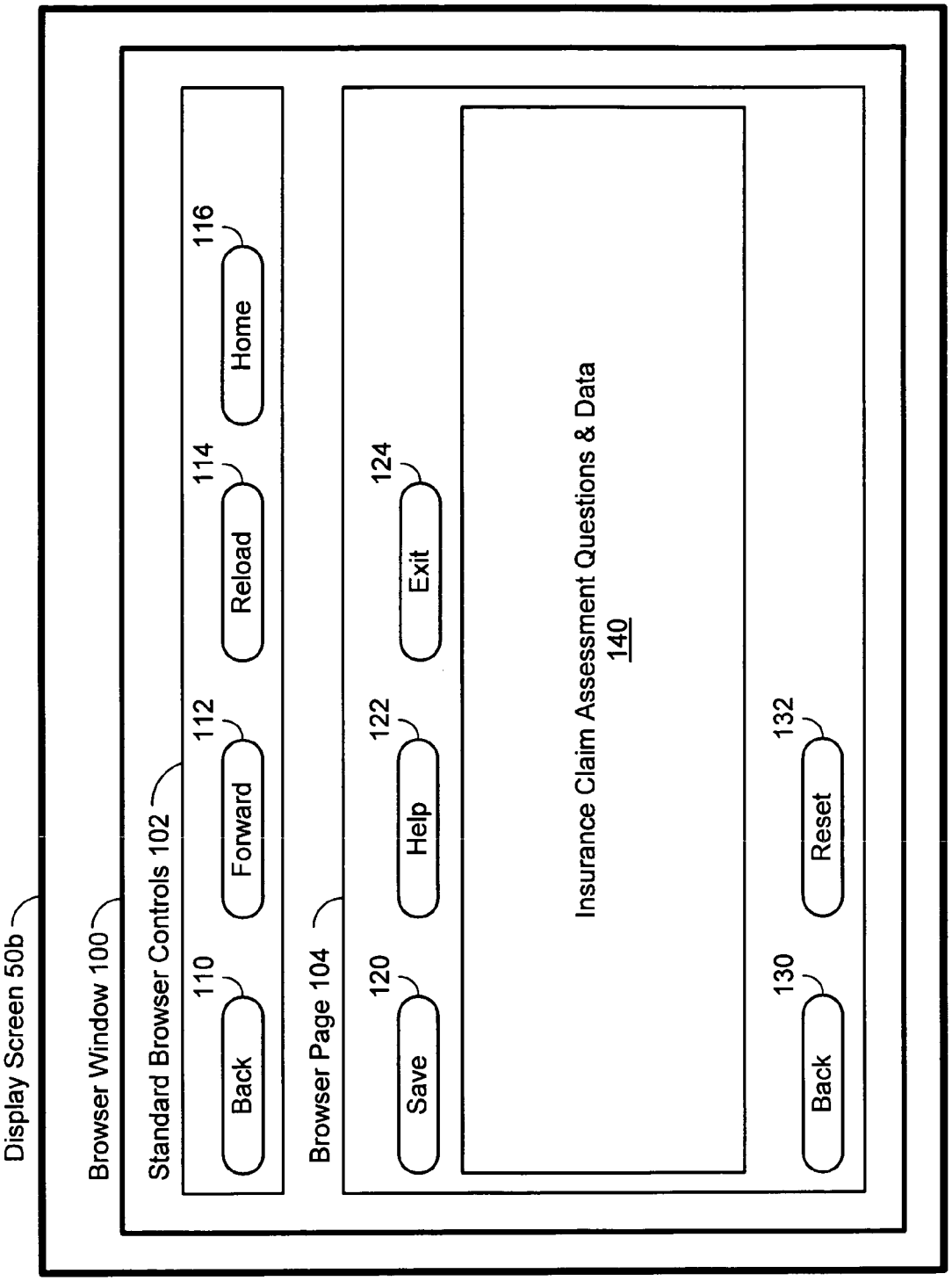
FIG. 6 illustrates an example of a browser-based user interface for the insurance claims processing system according to one embodiment.

FIG. 6: Browser-Based User Interface

FIG. 6 illustrates an example of a browser-based user interface for the insurance claims processing system according to one embodiment. The browser window 100 may be displayed in a display device 50b coupled to a client computer system. Typically, a web browser includes a set of standard navigation commands. As shown in FIG. 6, examples of these commands may include "back" 110 to move to the previously visited page, "forward" 112 to move to the page previously visited before selecting "back," "reload" 114 to obtain and redisplay the current page from the server, and "home" 116 to move to a previously designated home page. These standard navigation commands may be made available to the user as menu items and/or as buttons or other GUI elements. A button may be "pushed," often by a mouse click or appropriate keyboard key, to initiate the command supplied by the button.

The browser page 104 may include an active server page or other HTML-encoded page supplied by the web server 64. The page 104 may include one or more specialized navigation commands. In one embodiment, these specialized navigation commands may be displayed as buttons or other GUI elements. In one embodiment, the specialized navigation commands may include, for example, "save" 120 to save the status of a consultation session, "help" 122 to access a reference system for insurance claim processing, "exit" 124 to safely exit the insurance claim consultation session, "back" 130 to safely move to a previous page of the insurance claim consultation session, and "reset" 132 to reset the proper state of the browser page 104. The reset command is further described with reference to FIG. 9.

Insurance claim assessment data and/or insurance claim assessment questions 140 may also be displayed in the browser page 104. For example, for a given step in the insurance claim consultation session, one or more questions may be asked regarding bodily injuries and/or treatments thereof. A set of acceptable answers (i.e., insurance claim assessment data) may be supplied to the user, such as with a menu or series of check boxes. The user may then select from the possible answers and enter the insurance claim assessment data. The set of acceptable answers may be dynamically generated by the rules engine based upon answers to previous questions.

Figure 7:
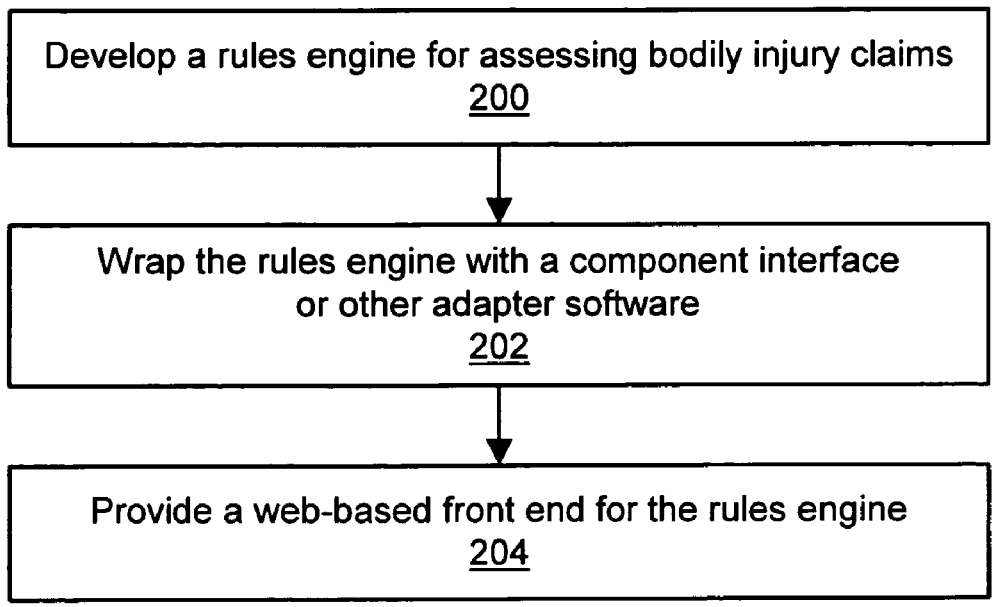
FIG. 7 is a flowchart illustrating a method of developing a web-based insurance claims processing system according to one embodiment.

FIG. 7: A Method of Developing a Web-Based Insurance Claims Processing System FIG. 7 is a flowchart illustrating a method of developing a web-based insurance claims processing system according to one embodiment. The steps shown in FIG. 7 may be performed in various orders according to various embodiments. In step 200, a rules engine may be developed or otherwise provided. As discussed with reference to FIG. 3a, the rules engine may be configured to estimate a value of an insurance claim as a function of insurance claim assessment data entered by a user in response to insurance claim assessment questions.

In step 202, the rules engine may be wrapped with a component interface in accordance with a component architecture specification. Component interfaces are discussed in greater detail with reference to FIGS. 4 and 5. The component interface may include one or more definitions of methods of communication or other access to the rules engine, such as by a web server. The component architecture specification may include a Component Object Model (COM) specification.

In step 204, a web server may be provided, wherein the web server which is configured to generate a plurality of web pages which are viewable by a web browser. The methods of communication in the component interfaces may be operable to transmit the insurance claim assessment data from the web server to the rules engine and operable to transmit the insurance claim assessment questions from the rules engine to the web server.

Figure 8:
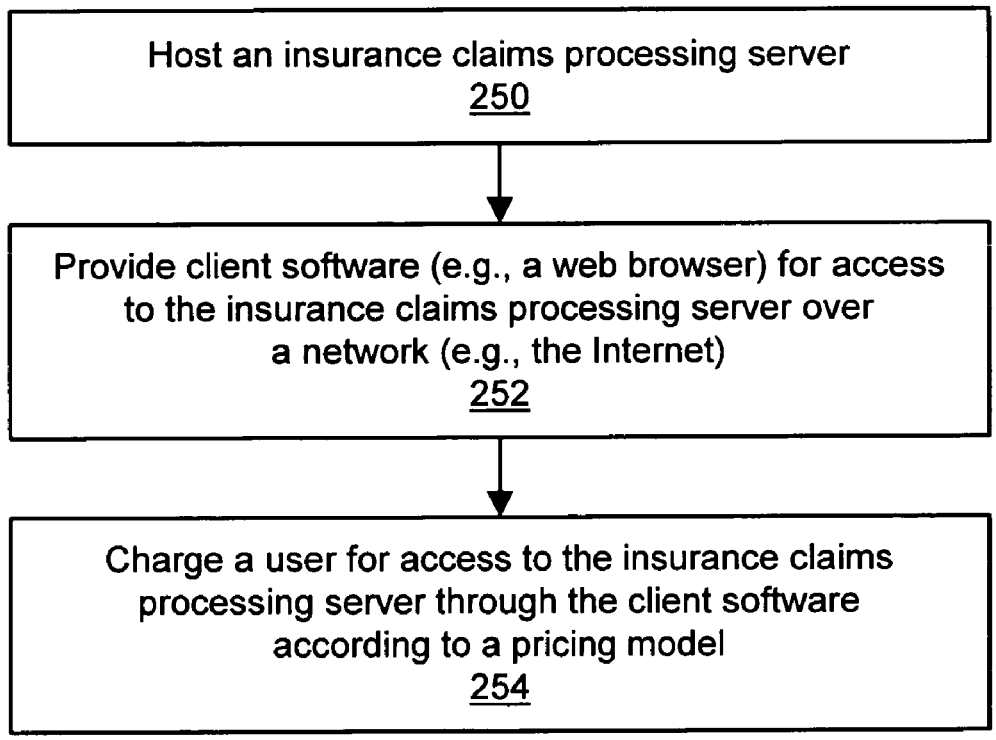
FIG. 8 is a flowchart illustrating a method of hosting a web-based insurance claims processing server with various pricing models according to one embodiment.

FIG. 8: A Method of Hosting a Web-Based Insurance Claims Processing System

FIG. 8 is a flowchart illustrating a method of hosting a web-based insurance claims processing server with various pricing models according to one embodiment. In step 250, an insurance claim processing server may be hosted. As used herein, "hosting" may include installing, maintaining, and/or otherwise providing client access to a server. The insurance claim processing server may be configured to estimate a value of an insurance claim as a function of insurance claim assessment data entered by a user during an insurance claim consultation session. In one embodiment, the insurance claim processing server may include a rules engine and a web server, and the client software may include a web browser. The web server may be operable to generate web pages and receive responses and requests from the web browser to enable communication between the rules engine and the web browser.

In step 252, client software such as a web browser may be provided to a user such as an insurance company. In one embodiment, the client software may include commercial, off-the-shelf web browser software which may already be in use by an insurance company and its employees who seek to access to the insurance claim processing server. The client software may be operable to receive the insurance claim assessment data entered by the user and send the insurance claim assessment data across a network to the insurance claim processing server. The insurance claim processing server may be operable to send the estimate of the value of the insurance claim to the client software across the network. In one embodiment, the network may include the Internet.

In step 254, the user may be charged for access to the insurance claim processing server through client software according to a pricing model. Various pricing models may be used with various embodiments of the hosting system and method. The pricing model may include a fee for each of a plurality of insurance claim consultation sessions conducted by the user. The pricing model may include a fee for each fixed period of access time of access by the user to the insurance claim processing server through the client software. For example, the fixed period of access time may include an hourly multiple, a weekly multiple, a monthly multiple, a yearly multiple, or a multiple of minutes. The pricing model may include a fee which varies directly with an amount of time spent accessing the insurance claim consultation session through the client software.

The user may include an insurance organization having a particular size, and the pricing model varies according to the size of the user. The size of the user may include a function of a quantity of employees of the user, a function of a revenue of the user over a period of time, and/or a function of a quantity of consultation sessions conducted by the user over a period of time. The pricing model may include a pricing discount given to the user after a particular quantity of insurance claim consultation sessions conducted by the user in a particular period of time. The insurance claim consultation session may include one or more insurance claim consultation transactions, and the pricing model may include a fee for each of a plurality of insurance claim consultation transactions conducted by the user during one or more insurance claim consultation sessions.

The method may further include charging additional users for access to the insurance claim processing server through client software according to a same or different pricing model.

Figure 9:
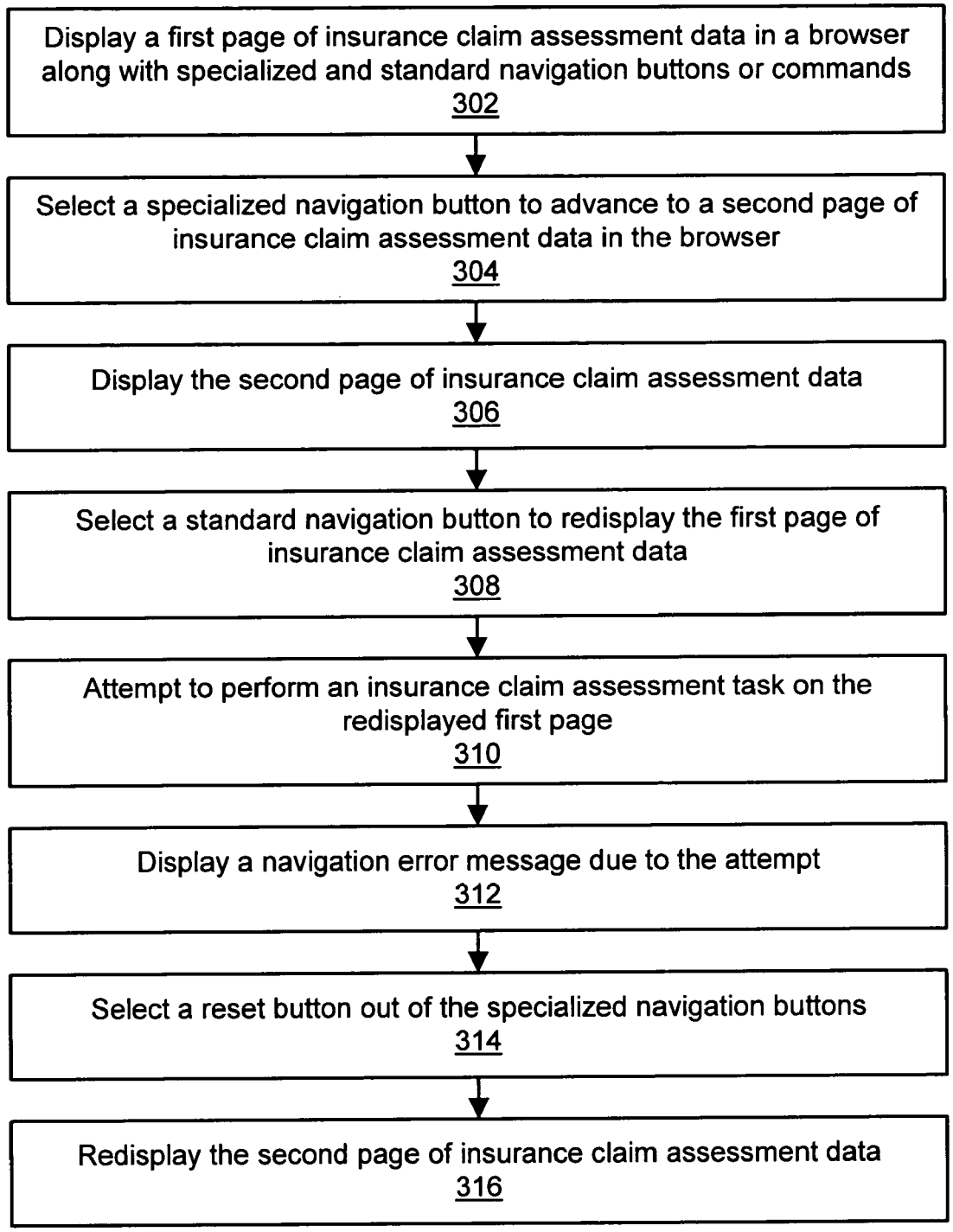
FIG. 9 is a flowchart illustrating a method of using a reset button provided by a web-based interface to a web-based insurance claims processing server according to one embodiment.

FIG. 9: A Method of Using a Reset Button for a Web-Based Insurance Claims Processing System FIG. 9 is a flowchart illustrating a method of using a reset button provided by a web-based interface to a web-based insurance claims processing server according to one embodiment. In step 302, a first page of insurance claim assessment data may be displayed in a browser program executing on a computer system. The browser program may include a web browser program which is operable to read and display web pages. The computer system which executes the browser program may include a client computer system which is communicatively coupled to a server computer system. The server computer system may be operable to generate and send a plurality of pages of insurance claim assessment data to the client computer system.

In one embodiment, in step 304, one of the specialized navigation commands, such as a forward command, may be selected to advance to a second page of insurance claim assessment data. In another embodiment, the user may advance to the second page by hitting "return" or otherwise instructing the insurance claim processing server to provide a next page in a consultation session. In step 306, the second page of insurance claim assessment data, including the specialized navigation commands, may be displayed in the browser.

In step 308, after the second page of insurance claim assessment data is displayed, one of the standard navigation commands, such as the "back" command or button available in a toolbar or menu in a web browser, may be selected to move back to the first page of insurance claim assessment data. The first page of insurance claim assessment data may then be redisplayed.

In step 310, the user may attempt to perform an insurance claim assessment task on the redisplayed first page of insurance claim assessment data. For example, the user may attempt to save a status of an insurance claim consultation by pressing a "save" button in the specialized buttons. The insurance claim consultation may include an interactive determination of an estimate of a value of an insurance claim through the entry of insurance claim assessment data in response to insurance claim assessment questions. The insurance claim assessment task may include selecting one of the other specialized navigation buttons provided as the user interface by insurance claim processing server. The insurance claim assessment task may also include entering new or modifying existing insurance claim assessment data. Insurance claim assessment data may include information relevant to an estimate of a value of an insurance claim, such as bodily injuries and treatments thereof. The insurance claim assessment data may include bodily injury claim assessment data, and the insurance claim assessment task may include a bodily injury claim assessment task.

In one embodiment, the state of the "conversation" between the browser and the insurance claim processing server may be preserved by a COM component 66, as discussed with reference to FIG. 5. In step 312, therefore, a navigation error may be generated as a result of the attempting to perform an insurance claim assessment task on the first page, when the second page is the "correct" page in the conversation. In one embodiment, a navigation error message may be generated and displayed to the user as a result of the generating the navigation error. The navigation error message may include an instruction to select a reset command, wherein the reset command is one of the specialized navigation commands.

In step 314, the user may select the reset command after viewing the navigation error message. In one embodiment, the insurance claim processing server may automatically perform a reset function without user intervention as a result of the navigation error.

In step 316, the second page (i.e., the "correct" page) of insurance claim assessment data may then be redisplayed. The user may then perform a second insurance claim assessment task on the redisplayed second page of insurance claim assessment data.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A system comprising:
    an insurance claim processing server comprising a first CPU and a first memory coupled to the first CPU, wherein the first memory stores a first set of program instructions which are executable by the first CPU to:
        estimate a value of an insurance claim as a function of insurance claim assessment data, wherein the first set of program instructions further comprise a sequence of insurance claim processing steps executable to complete an insurance claim transaction, wherein the number of insurance claim processing steps and/or the sequence of execution of the insurance claims processing steps are established dynamically in real time; and
    a client computer system comprising a second CPU and a second memory coupled to the second CPU, wherein the client computer system is coupled to the insurance claim processing server through a network, wherein the second memory stores a second set of program instructions which are executable by the second CPU to:
        receive the insurance claim assessment data entered by a user; and
        send the insurance claim assessment data across the network to the insurance claim processing server, wherein the second set of program instructions comprises a sequence of steps established dynamically in real time.

2. The system of claim 1, wherein the insurance claim comprises a bodily injury claim, and wherein the estimate of the value of the insurance claim comprises an estimate of bodily injury general damages.

3. The system of claim 1, wherein the first set of program instructions comprises a rules engine; and wherein the second set of program instructions comprises a web browser.

4. The system of claim 3, wherein the first set of program instructions are further executable by the first CPU to generate and send to the client computer system a plurality of web pages comprising insurance claim assessment questions; wherein the second set of program instructions are further executable by the second CPU to display the web pages comprising the insurance claim assessment questions during the insurance claim consultation session.

5. The system of claim 1, wherein the network comprises the Internet.

6. The system of claim 1, wherein the insurance claim processing server and the client computer system are operable to communicate over the network via TCP/IP.

7. The system of claim 1, further comprising:
    a second client computer system comprising a third CPU and a third memory, wherein the second client computer system is coupled to the insurance claim processing server through the network, wherein the third memory stores a third set of program instructions which are executable by the third CPU to:
        receive a second set of insurance claim assessment data entered by a second user; and
        send the second set of insurance claim assessment data across the network to the insurance claim processing server; and wherein the first set of program instructions are further executable by the first CPU to estimate a value of a second insurance claim as a function of the second set of insurance claim assessment data entered by the second user during a second insurance claim consultation session.

8. The system of claim 1, wherein the insurance claim assessment data comprise one or more bodily injuries and one or more treatments of the bodily injuries.

9. A method comprising:
    receiving insurance claim assessment data entered by a user in response to a plurality of insurance claim assessment questions during an insurance claim consultation session; and
    sending the insurance claim assessment data across a network via one or more Internet protocols to an insurance claim processing server;
    executing insurance claim processing steps on the insurance claim processing server to estimate a value of an insurance claim as a function of insurance claim assessment data, wherein the number of insurance claim processing steps and/or the sequence of execution of the insurance claims processing steps are established dynamically in real time.

10. The method of claim 9, wherein the Internet protocols comprise TCP/IP.

11. The method of claim 9, wherein the Internet protocols comprise HTTP.

12. The method of claim 9, further comprising sending the estimated value of the insurance claim across the network via the one or more Internet protocols to a client computer system.

13. The method of claim 9, wherein the insurance claim comprises a bodily injury claim, and wherein the estimated value of the insurance claim comprises an estimate of bodily injury general damages.

14. The method of claim 9, wherein the insurance claim assessment data comprise one or more bodily injuries and one or more treatments of the bodily injuries.

* * * * *